US011027738B2

(12) United States Patent
Linsmeier et al.

(10) Patent No.: US 11,027,738 B2
(45) Date of Patent: Jun. 8, 2021

(54) SYSTEMS AND METHODS FOR RESPONSE VEHICLE PUMP CONTROL

(71) Applicant: Oshkosh Corporation, Oshkosh, WI (US)

(72) Inventors: Eric R. Linsmeier, Larsen, WI (US); Brian Piller, Neenah, WI (US); David W. Archer, Hortonville, WI (US); Chad T. Dolphin, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 240 days.

(21) Appl. No.: 16/413,033

(22) Filed: May 15, 2019

(65) Prior Publication Data
US 2019/0263408 A1 Aug. 29, 2019

Related U.S. Application Data

(63) Continuation of application No. 15/487,146, filed on Apr. 13, 2017, now Pat. No. 10,370,003.

(51) Int. Cl.
| | |
|---|---|
| *B60W 30/18* | (2012.01) |
| *B60W 30/188* | (2012.01) |
| *B60K 17/28* | (2006.01) |
| *B60K 25/06* | (2006.01) |
| *B60W 10/06* | (2006.01) |
| *B60W 10/11* | (2012.01) |
| *B60W 10/30* | (2006.01) |
| *B60W 50/14* | (2020.01) |
| *G07C 5/08* | (2006.01) |

(Continued)

(52) U.S. Cl.
CPC ......... *B60W 30/1888* (2013.01); *A62C 27/00* (2013.01); *B60K 17/28* (2013.01); *B60K 25/06* (2013.01); *B60W 10/06* (2013.01); *B60W 10/11* (2013.01); *B60W 10/30* (2013.01); *B60W 50/14* (2013.01); *G05D 16/2066* (2013.01); *G07C 5/0816* (2013.01); *B60W 2050/146* (2013.01); *B60W 2510/0638* (2013.01); *B60W 2710/0644* (2013.01); *B60W 2710/1005* (2013.01); *B60W 2710/305* (2013.01); *B60Y 2200/14* (2013.01)

(58) Field of Classification Search
None
See application file for complete search history.

(56) References Cited

U.S. PATENT DOCUMENTS

| | | | |
|---|---|---|---|
| 3,726,428 | A | 4/1973 | Lark et al. |
| 4,189,005 | A | 2/1980 | McLoughlin |

(Continued)

FOREIGN PATENT DOCUMENTS

| | | |
|---|---|---|
| AT | 52875 | 5/2003 |
| CA | 2121181 | 3/1999 |

(Continued)

*Primary Examiner* — Mary Cheung
(74) *Attorney, Agent, or Firm* — Foley & Lardner LLP

(57) ABSTRACT

A vehicle includes an engine, a transmission coupled to the engine, a pumping system selectively coupled to the engine by the transmission, and a controller. The pumping system is configured to receive an inlet flow of water from a water source. The controller is configured to receive an indication regarding a pressure of the inlet flow of water and transmit a control signal to the transmission to change a gear of the transmission based on the indication regarding the pressure of the inlet flow of water.

17 Claims, 5 Drawing Sheets

(51) Int. Cl.
*A62C 27/00* (2006.01)
*G05D 16/20* (2006.01)

(56) References Cited

U.S. PATENT DOCUMENTS

| | | | |
|---|---|---|---|
| 4,473,334 A | 9/1984 | Brown | |
| 4,589,537 A | 5/1986 | Nishikawa et al. | |
| 4,741,661 A | 5/1988 | Carey | |
| 4,875,269 A | 10/1989 | Crist | |
| 5,009,244 A * | 4/1991 | Grindley | A62C 5/02 137/101.11 |
| 5,537,887 A | 7/1996 | Jang et al. | |
| 5,538,274 A | 7/1996 | Schmitz et al. | |
| 5,782,596 A | 7/1998 | Young et al. | |
| 5,820,150 A | 10/1998 | Archer et al. | |
| 5,897,123 A | 4/1999 | Cherney et al. | |
| 6,561,718 B1 | 5/2003 | Archer et al. | |
| 6,860,332 B1 | 3/2005 | Archer et al. | |
| 6,883,815 B2 | 4/2005 | Archer | |
| 6,976,688 B2 | 12/2005 | Archer et al. | |
| 7,006,902 B2 | 2/2006 | Archer et al. | |
| 7,055,880 B2 | 6/2006 | Archer | |
| 7,387,348 B2 | 6/2008 | Archer et al. | |
| 7,389,826 B2 | 6/2008 | Linsmeier et al. | |
| 8,201,656 B2 | 6/2012 | Archer et al. | |
| 8,801,393 B2 | 8/2014 | Crabtree et al. | |
| 8,839,902 B1 | 9/2014 | Archer et al. | |
| 8,894,521 B2 | 11/2014 | Tsukuda et al. | |
| 9,061,169 B2 | 6/2015 | Linsmeier | |
| 9,492,695 B2 | 11/2016 | Betz et al. | |
| 9,580,962 B2 | 2/2017 | Betz et al. | |
| 2001/0016165 A1 | 8/2001 | Shimabukuro et al. | |
| 2002/0192063 A1 | 12/2002 | Fluke, Jr. | |
| 2003/0230412 A1 | 12/2003 | Archer | |
| 2003/0230863 A1 | 12/2003 | Archer | |
| 2004/0039510 A1 | 2/2004 | Archer et al. | |
| 2004/0136821 A1 | 7/2004 | Berger et al. | |
| 2004/0156706 A1 | 8/2004 | Weller et al. | |
| 2005/0001400 A1 | 1/2005 | Archer et al. | |
| 2006/0021764 A1 | 2/2006 | Archer et al. | |
| 2006/0022001 A1 | 2/2006 | Linsmeier et al. | |
| 2006/0032701 A1 | 2/2006 | Linsmeier et al. | |
| 2006/0032702 A1 | 2/2006 | Linsmeier et al. | |
| 2006/0065411 A1 | 3/2006 | Linsmeier et al. | |
| 2006/0086566 A1 | 4/2006 | Linsmeier et al. | |
| 2006/0104786 A1 | 5/2006 | Shepherd et al. | |
| 2006/0180322 A1 | 8/2006 | Archer et al. | |
| 2008/0019815 A1 | 1/2008 | Harris et al. | |
| 2008/0068923 A1 * | 3/2008 | Pitrolffy | B01F 7/00908 366/164.1 |
| 2009/0095545 A1 | 4/2009 | Crabtree et al. | |
| 2010/0289238 A1 | 11/2010 | Archer et al. | |
| 2011/0170997 A1 | 7/2011 | Addleman et al. | |
| 2012/0221219 A1 | 8/2012 | Murata | |
| 2013/0098642 A1 | 4/2013 | McLoughlin et al. | |
| 2013/0218429 A1 | 8/2013 | Ayabe et al. | |
| 2014/0246265 A1 | 9/2014 | Archer et al. | |
| 2014/0262355 A1 | 9/2014 | Linsmeier | |
| 2016/0144211 A1 | 5/2016 | Betz et al. | |
| 2016/0145941 A1 | 5/2016 | Betz et al. | |
| 2016/0304051 A1 | 10/2016 | Archer et al. | |
| 2018/0106367 A1 | 4/2018 | Mouri et al. | |

FOREIGN PATENT DOCUMENTS

| | | |
|---|---|---|
| CN | 101072606 | 11/2007 |
| DE | 40210402 | 1/2003 |
| DE | 60330628 | 12/2009 |
| DE | 60334178 | 9/2010 |
| EP | 0 706 904 | 4/1996 |
| EP | 1 781 383 | 5/2007 |
| EP | 1 804 927 | 7/2007 |
| EP | 1 371 391 B1 | 12/2009 |
| EP | 2 195 222 | 6/2010 |
| EP | 1 371 392 | 9/2010 |
| FR | D27565 | 3/2003 |
| GB | 2 277 304 | 2/1997 |
| GB | D 300 9436 | 3/2003 |
| GB | 2 365 829 | 9/2004 |
| GB | 2 400 588 | 1/2005 |
| GB | 2 400 589 | 2/2005 |
| GB | 2 400 590 | 3/2005 |
| IT | T020020000309 | 9/2004 |
| WO | WO-98/05529 A1 | 2/1998 |
| WO | WO-2005/051832 A2 | 6/2005 |
| WO | WO-2006/015242 | 2/2006 |
| WO | WO-2006/015272 | 2/2006 |
| WO | WO-2006/037100 | 4/2006 |
| WO | WO-2006/096202 | 9/2006 |
| WO | WO-2006/101865 | 9/2006 |
| WO | WO-2009/046246 | 4/2009 |
| WO | WO-2016/085652 | 6/2016 |
| WO | WO-2016/085653 | 6/2016 |
| WO | WO-2006/086614 | 8/2016 |
| WO | WO-2016/171965 | 10/2016 |

\* cited by examiner

SYSTEMS AND METHODS FOR RESPONSE VEHICLE PUMP CONTROL

CROSS-REFERENCE TO RELATED PATENT APPLICATION

This application is a continuation of U.S. patent application Ser. No. 15/487,146, filed Apr. 13, 2017, which is incorporated herein by reference in its entirety.

BACKGROUND

Traditional pump control systems in response vehicles provide little by way of flexibility. For example, traditional systems may maintain an overall output pressure of the pumping system at a constant level, but provide little to no control of the output pressure of fluid emitted towards an area of interest. Additionally, traditional pump control systems allow for little to no adjustment based on the intake pressure of the pump from a fluid source. Such constraints place limitations on response vehicle performance.

SUMMARY

One embodiment relates to a vehicle. The vehicle includes an engine, a transmission coupled to the engine, a pumping system selectively coupled to the engine by the transmission, and a controller. The pumping system is configured to receive an inlet flow of water from a water source. The controller is configured to receive an indication regarding a pressure of the inlet flow of water and transmit a control signal to the transmission to change a gear of the transmission based on the indication regarding the pressure of the inlet flow of water.

Another embodiment relates to a vehicle. The vehicle includes a pumping system and a controller. The pumping system is configured to receive an inlet flow of water from a water source. The controller is configured to determine a location of the vehicle and automatically enter the pumping system into a pumping mode at least in response to the vehicle being within a threshold distance of a destination.

Still another embodiment relates to a vehicle. The vehicle includes a pumping system and a controller. The pumping system is configured to receive an inlet flow of water from a water source. The controller is configured to operate the pumping system in a first mode such that the pumping system provides an outlet flow of water to an outlet at a first outlet pressure and operate the pumping system in a second mode such that the pumping system provides the outlet flow of water to the outlet at a second outlet pressure that is less than the first outlet pressure. The first mode is engaged for discharging the outlet flow of water to an ambient environment. The second mode is engaged for providing the outlet flow of water to a second vehicle connected to the vehicle.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Before turning to the figures which illustrate the exemplary embodiments in detail, it should be understood that the application is not limited to the details or methodology set forth in the following detailed description or illustrated in the figures. It should also be understood that the phraseology and terminology employed herein is for the purpose of description only and should not be regarded as limiting.

According to an exemplary embodiment, a central controller for a response vehicle (e.g., a fire truck) is provided. The central controller interfaces with various subsystems of the vehicle (e.g., the drive system, fluid output systems, etc.) to provide an amount of control over a pumping system of that is superior to that provided by traditional systems. For example, the central controller may interface with various sensors disposed throughout the vehicle to receive various indications as to the operation of the pumping system. Signals indicative of discharge pressures, intake pressures, intake vacuum(s), water temperature, water levels, and the like may be used to measure the performance of the pumping system and to inform various personnel (e.g., an operator, commander, or other personnel) regarding the operation of the pumping system.

According to the exemplary embodiment, the central controller may also control the operation of the pumping system based on various inputs. For example, the controller may receive an input to place the response vehicle into a pumping mode, and automatically perform various steps (e.g., place the transmission into neutral, engage a power take off device to couple an engine to the pumping system, and place the transmission back into gear) to place the vehicle into a pumping mode. Additionally, the central controller may receive an input regarding a preferred fluid output (e.g., a preferred output pressure) at a plurality of outlets of the vehicle, and control the engine and/or pumping system of the vehicle so as to maintain the preferred fluid output at the outlets. Additionally, the central controller may receive various inputs regarding an intake pressure of the pumping system from a fluid source. In response to receiving an indication of a positive fluid source, for example, the central controller may change the gear ratio of the transmission of the vehicle so as to maintain an engine RPM suitable for operating various vehicle subsystems while avoiding over-pressurizing the pumping system.

Figure 1:
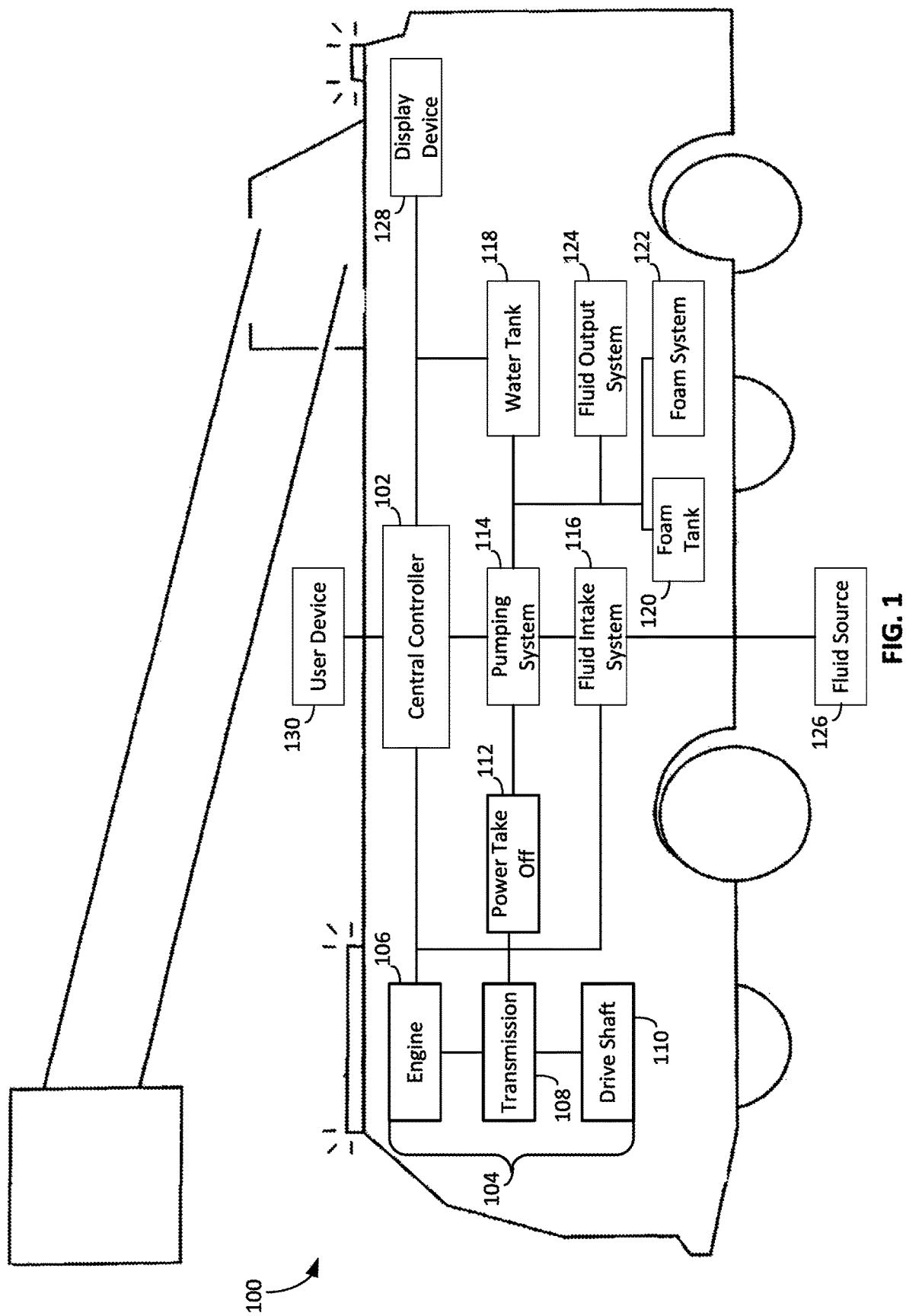
FIG. 1 is a block diagram of a response vehicle including various features described herein, according to an exemplary embodiment.

Referring generally to FIG. 1, a vehicle is shown according to an exemplary embodiment. The vehicle is shown as a firefighting vehicle 100 which is configured to deliver a firefighting agent, such as water, foam, and/or any other fire suppressant to an area of interest (e.g., building, environmental area, airplane, automobile, another firefighting vehicle, etc.) using a vehicle fluid delivery system. Vehicle 100 generally comprises a chassis, a cab supported at a front portion of the chassis, a body supported by the chassis rearward of the cab, a drive system for operating the vehicle and/or one or more systems thereof, and a fluid delivery system. The fluid delivery system generally includes a fluid supply system, a fluid discharge system, a fluid conduit system, and a pump system for pressurizing and/or displacing a firefighting fluid or other agent.

As shown in FIG. 1, the vehicle 100 includes a control system, shown as central controller 102. By way of overview, the central controller 102 includes a plurality of interfaces facilitating the central controller 102 receiving and transmitting signals from various subsystems, shown as vehicle subsystems 104-124, a display, shown as display 128, and a user device 130 by way of a wireless connection described below. As such, the central controller 102 facilitates the control of various subsystems 104-124 of the vehicle 100 by way of various means. In the exemplary embodiment shown, the central controller 102 is further configured to establish connections with various devices (e.g., the user device 130 described below) and transmit various communications (e.g., instructions, data, and the like) to those external devices. A more detailed description of the central controller 102 will be provided below in relation to FIG. 4.

The vehicle 100 includes a drive system, shown as drive system 104. The drive system 104 provides power to operate the vehicle 100 and certain other subsystems 106-124 of the vehicle 100. Drive system 104 generally comprises a power source or prime mover and a motion transfer device. The prime mover generally generates mechanical energy (e.g., rotational momentum) from an energy source (e.g., fuel). Examples of suitable prime movers include, but are limited to, an internal combustion gas-powered engine, a diesel engine, a turbine, a fuel cell driven motor, an electric motor or any other type of motor capable of providing mechanical energy. Any of the above mentioned prime movers may be used alone or in combination with one or more additional power sources (as in a hybrid vehicle) to provide mechanical energy. In the example, shown, the prime move includes an internal combustion engine 106.

The motion transfer device is coupled to a power output of the prime mover and is configured to transfer the mechanical energy produced by the prime mover to various other elements of the vehicle 100. In the example shown, the motion transfer device includes a transmission 108. The transmission 108 may be any of a variety of suitable transmissions (e.g., standard, hybrid, automatic, etc.). The transmission 108 may include an input shaft coupled to the engine 106 and at least one output shaft. A gear system including a plurality of ratio gears may selectively engage with a gear coupled to the input shaft so provide a multi-ratio output. The transmission 108 may include a plurality of clutches so as to selectively engage various gears to produce a desired rotational output. In the exemplary embodiment shown, the transmission includes a transmission sub-controller (not shown) configured to receive various control signals from the central controller 102 and produce an output control signal to control the mode and/or gear ratio of the transmission 108. For example, the output control signal may control the operation of various solenoid valves coupled to various clutches to control the operating gear ratio of the transmission 108. As will be described below, the output control signal of the transmission sub-controller may be based on various inputs (e.g., an operator input 430, sensor signal received at the fluid intake system interface 436, etc.) produced by the vehicle 100. The output of the transmission 108 may be coupled to the a drive shaft 110 of the vehicle 100 to provide mechanical energy to various motive members (e.g., wheels via a differential or the like) of the vehicle 100 to propel the vehicle 100 in response to an input (e.g., a throttle input) being provided to the engine 106.

The vehicle 100 further includes a power take off device (PTO) 112 configured to selectively couple the output of the transmission 108 to the pumping system 114 of the vehicle 100. In some embodiments, the PTO 112 includes a clutch (not shown) that selectively couples the output of the transmission 108 to the pumping system 114 via the PTO 112 (e.g., when the operator selects a "pumping mode" for the vehicle 100). In some embodiments, such a clutch may be only be engaged when the transmission 108 has been placed in a certain mode of operation (e.g., omtp neutral) and/or when the vehicle 100 is stationary. In some embodiments, the PTO 112 may include an axillary gearbox including a plurality of gear ratios to alternate the rate at which rotational energy is provided to the pumping system 114. The PTO 112 may include a PTO sub-controller (not shown) configured to monitor the mode of operation of the PTO 112 (e.g., the current gear ratio, the engagement of the clutch, etc.) and receive various control signals from the central controller 102 to control the operation of the PTO 112. In some embodiments, the PTO is integrated with or otherwise a part of the transmission 108.

The pumping system 114 is configured to draw fluid from a fluid source 126 for use by the vehicle 100 via the fluid intake system 116. Pumping system 114 may include any mechanism that can use mechanical energy to create a pressure differential. For example, in one embodiment, the pumping system 114 includes a liquid pump coupled to the PTO 112. The pumping system 114 may also be configured to selectively provide water to either the water tank 118 or the fluid output system 124. The water tank 118 may be any structure capable of holding water, such as a vessel, container, chamber, volume, etc.

The fluid intake system 116 is configured to interface with the fluid source 126 and provide fluid therefrom to the pumping system 114. In some embodiments, the fluid intake system 116 is integrated with a suction inlet of the pumping system 114. In the example embodiment shown, the fluid intake system 116 is configured to measure an intake pressure of the fluid from the fluid source 126 to provide an input to the central controller 102, as described herein. A more detailed explanation of the fluid intake system 116 will be provided below in relation to FIG. 2.

Still referring to FIG. 1, the vehicle 100 further includes a foam system 122. In the example shown, the foam system 122 is placed downstream of the pumping system 114. Fluid drawn by the pumping system 114 from the fluid source 126 or the water tank 118 may be combined with a foamant stored in the foam tank 120. In some embodiments, the foam system 122 includes a pump separate from the pumping system 114 and an associated controller (not shown). The pump may draw foamant stored in the foam tank 120 and force the foamant through a check valve into a port in fluidic communications with an outlet of the pumping system 114 prior to the fluidic output reaching the output system 124. In some embodiments, the rate at which foamant is drawn from the foam tank depends on an input received from an operator or other user (e.g., from the central controller 102 described below). Additionally, the central controller 102 may selectively open or close the check valve of the foam system 120 depending on the mode of operation of the pumping system 114, as described below.

The fluid output system 124 is configured to direct fluid provided by the pumping system 114 (or a combination of outputs from the pumping system 114 and the foam system 122) to an area of interest. In the exemplary embodiment shown, the fluid output system 124 is configured to provide input signals to the central controller 102. The input signals may be generated via an input received from a user or by a sensing device configured to detect at least one characteristic of a fluid output being emitted by the fluid output system 124. A more detailed description of the fluid output system 124 will be provided below in relation to FIG. 3.

Still referring to FIG. 1, the vehicle 100 further includes a display, shown as display 128. Display 128 may be, for example, a display (e.g., a CANlink® CL-711 display manufactured by HED Inc., etc.) having an interface (e.g., a touchscreen, a display with a row of buttons disposed along one side thereof, etc.) that receives an input from a user. Display 128 may support any type of display feature, such as a flipbook-style animation, or any other type of transition feature. Display 128 may generally provide a plurality of navigation buttons that allow a user to select various displays and other options via touch. Display 128 may further, upon detection of a sensor signal captured by any of the vehicle subsystems 104-124, generate a graphical representation of the sensor signal. For example, if a signal is received from a water level sensor of the water tank 118, a water level screen may be displayed that informs the operator of the current water level. Display 128 may have a wired or wireless connection with other response vehicle subsystems and/or with remote devices.

The display 128 may be configured to display a graphical user interface, an image, an icon, a notification, and indication, and/or still other information. In the exemplary embodiment shown, the display includes a graphical user interface configured to provide general information about the vehicle 100 captured by the various sensing devices included in the various vehicle subsystems 104-124. Through such an interface, the operator may be able to view various fluid levels of the vehicle 100 (e.g., fuel level, water tank level, transmission fluid level, foam level, etc.), tire pressures, the mileage of the vehicle 100, battery voltage levels, and the like.

The display 128 may include any number of supporting buttons and other tactile user inputs to support interaction between a user and the display. For example, a plurality of push buttons may be located next to or below the display to provide the user with further options. It should be understood that the configuration of the display 128 may vary without departing from the scope of the present disclosure.

The display 128 may include or support various technologies. For example, the display 128 be a touchscreen display and may be separated into any number of portions (e.g., a split-screen type display, etc.). For example, a first portion of the screen may be reserved for one particular type of display (e.g., warnings and alerts, etc.), while another portion of the screen may be reserved for general vehicle information (e.g., speed, fuel level, etc.). The display 128 may be configured to handle any type of transition, animation, or other display feature that allows for ease of access of information on the display.

In one embodiment, the display 128 is coupled to a USB input, allowing the display software to be updated. For example, such updates may include updating the maps stored on the display (e.g., to improve navigation features, etc.). Further, custom files may be downloaded to the display (e.g., custom logos, images, text, etc.) to personalize the display 128 for use in the vehicle 100.

The display may include any number of video inputs (e.g., from one or more cameras located on the vehicle 100, etc.). For example, the display may be capable of receiving four video inputs and may display up to four video inputs simultaneously on the display. The display may be configured to detect when a camera feed is up, therefore determining when to display a video input on the display or not (e.g., not displaying a blank or blue screen, etc.).

The user device 130 is a device associated with a user. The user may include any individual having any sort of association with the vehicle 100. In various other embodiments, the user may include emergency response personnel (e.g., firefighters, management personnel, and the like), government inspectors, and the like. The user device 130 may include any type of device capable of establishing a connection and receiving information from the central controller 102. As such, the user device 130 may include wearable devices such as a smart watch or a mobile computing device such as a smart phone, tablet, personal digital assistant, and laptop computing device. Alternatively, the user device 130 may include a stationary computing system such as a desktop computer located, for example, at the fire station associated with the vehicle 100.

Figure 2:
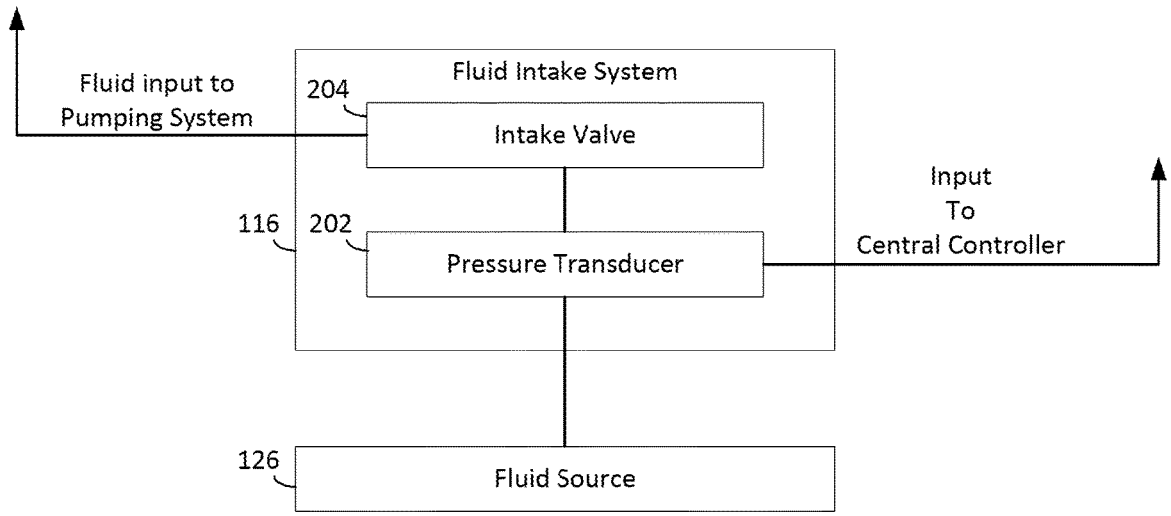
FIG. 2 is a block diagram of a fluid intake system of the response vehicle of FIG. 1, according to an exemplary embodiment.

Turning now to FIG. 2, the fluid intake system 116 is described in more detail. In the example shown, the fluid intake system 116 includes a pressure transducer 202 and an intake valve 204. The intake valve 204 is configured to control a fluid flow from the fluid source 126. For example, in some embodiments the intake valve 204 may receive various control signals from the central controller 102. In response, the intake valve 204 may open or close by an amount indicated by the control signals so as to control fluid input from the fluid source 126 independent of the energy applied by the pumping system 114. In some embodiments, the intake valve 204 may detect the status of the connection of any hoses (e.g., intake lines) to the central controller 102. Pressure transducer 202 is generally a pressure transducer (e.g., a vacuum transducer) configured to determine intake pressure and to communicate a signal representing intake pressure to the central controller 102. Pressure transducer 202 may communicate the signal to the central controller 102 via a wired or wireless connection. In some embodiments the pressure transducer 202 is integrated with the intake valve 204.

Figure 3:
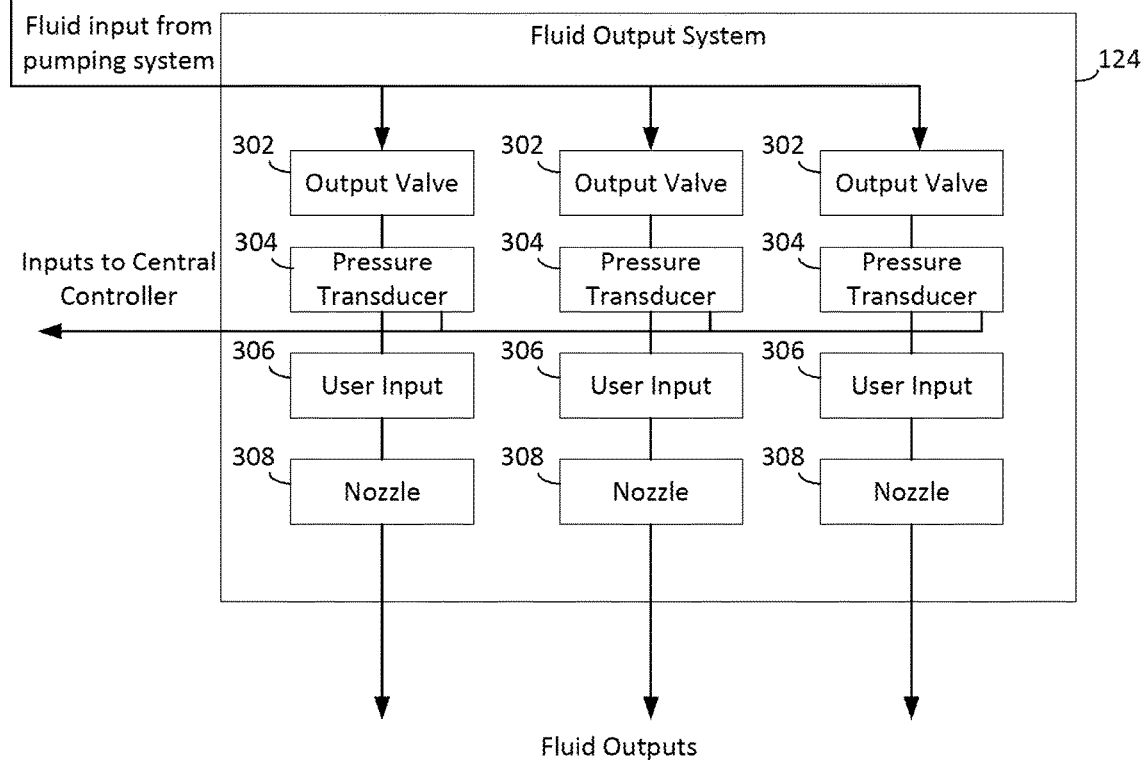
FIG. 3 is a block diagram of a fluid output system of the response vehicle of FIG. 1, according to an exemplary embodiment.

Turning now to FIG. 3, the fluid output system 124 is described in more detail. Generally, fluid output system 124 may be or refer to any of a number of liquid discharge systems including a hose or line network coupled to a pump panel. As shown the fluid output system 124 includes three outlets, with each outlet including an output valve 302, a pressure transducer 304, a user input 306 and a nozzle 308. The output valves 302 are configured to control various characteristics of a fluid flow directed to an area of interest via the nozzle 308. As such, the output valve 302 may have a plurality of positions (e.g., closed, open, and various levels between). In some embodiments, the output valve 302 may include a user input 306 configured to receive various inputs form an output operator. For example, the user input 306 may include a knob enabling the user to indicate a preference as to the level of openness of the output valve 302 to control characteristics for the flow emitted from the nozzle 308. In another example, the operator input may enable the operator select a desired fluid output pressure. In some embodiments, such inputs may be transmitted (e.g., by way of a wireless transceiver or a wired connection) to the central controller 102 and used to control various other vehicle subsystems 104-124 as described below.

The pressure transducer 304 is configured to measure a water pressure level at the output. In the exemplary embodiment shown, the pressure transducer 304 is similar to the transducer 202 discussed above. As such, the pressure transducer 304 may measure the pressure at the output and transmit an input signal indicative of the pressure level back to the central controller 102. The nozzle 308 may a deluge gun, a water cannon, a deck gun, or any other piece of equipment capable of controlling the direction or other characteristics (e.g., spray type, spray velocity, etc.) of a fluid flow emitted from the output.

Figure 4:
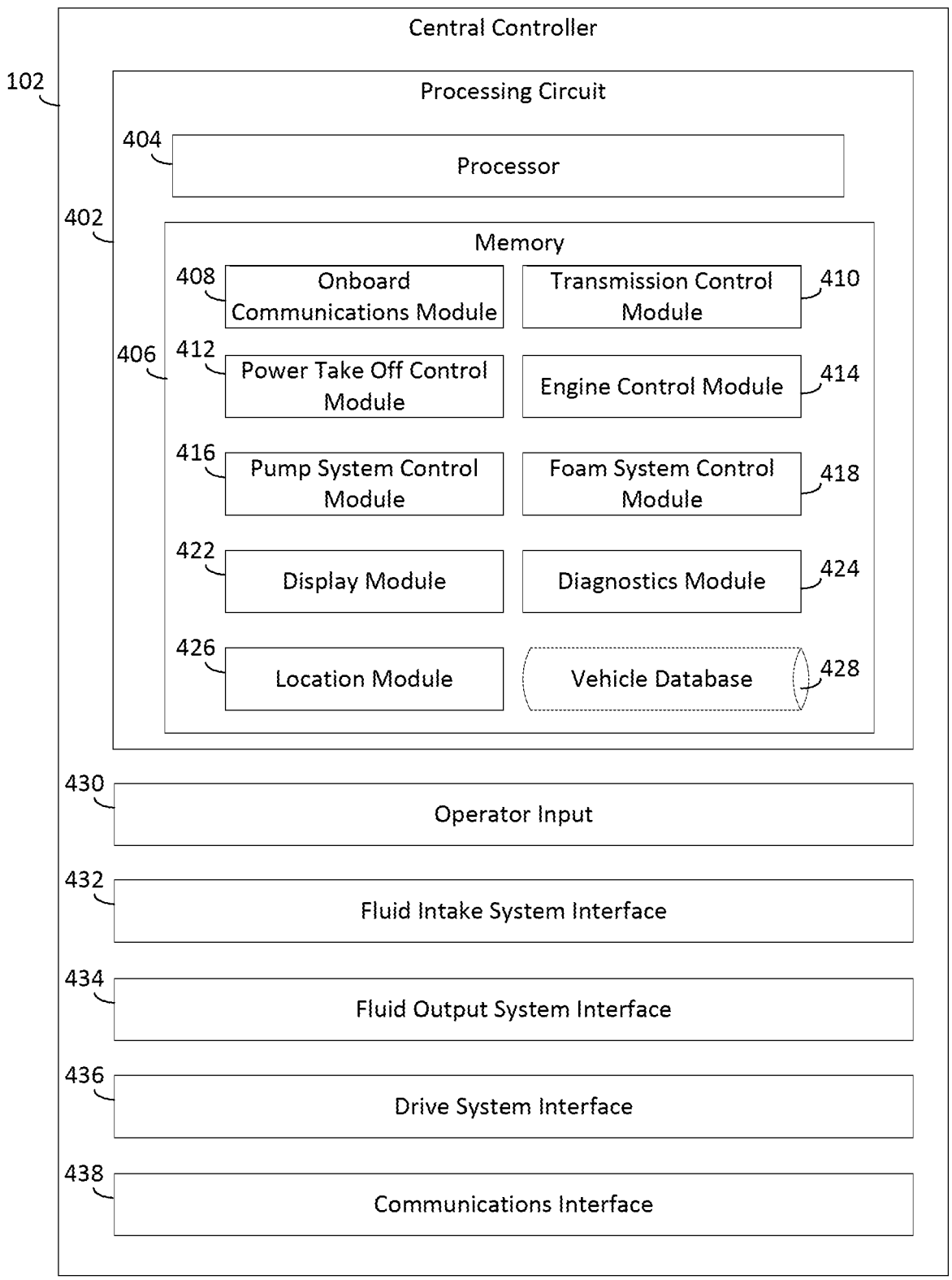
FIG. 4 is a block diagram of a central controller for a response vehicle, according to an exemplary embodiment.

Referring now to FIG. 4, a more detailed view of the central controller 102 of the vehicle 100 of FIG. 1 is shown, according to an exemplary embodiment. The central controller 102 includes a processing circuit 402 including a processor 404 and a memory 406. Processor 404 may be a general purpose or specific purpose processor, an application specific integrated circuit (ASIC), one or more field programmable gate arrays (FPGAs), a group of processing components, or other suitable processing components. Processor 404 may be configured to execute computer code or instructions stored in memory 406 or received from other computer readable media (e.g., CDROM, network storage, a remote server, etc.) to perform one or more of the processes described herein. Memory 406 may include one or more data storage devices (e.g., memory units, memory devices, computer-readable storage media, etc.) configured to store data, computer code, executable instructions, or other forms of computer-readable information. Memory 406 may include random access memory (RAM), read-only memory (ROM), hard drive storage, temporary storage, non-volatile memory, flash memory, optical memory, or any other suitable memory for storing software objects and/or computer instructions. Memory 406 may include database components, object code components, script components, or any other type of information structure for supporting the various activities and information structures described in the present disclosure. Memory 406 may be communicably connected to processor 404 via processing circuit 402 and may include computer code for executing (e.g., by processor 404, etc.) one or more of the processes described herein.

The memory 406 is described below as including various modules. While the exemplary embodiment shown in the figures shows each of the modules 408-426 as being separate from one another, it should be understood that, in various other embodiments, the memory may include more, less, or altogether different modules. For example, the structures and functions of one module may be performed by another module, or the activities of two modules may be combined such that they are performed by only a signal module. Additionally, it should be understood that any of the functionalities described as being performed by a module that is a part of the central controller 102 below may also be performed by a separate hardware component having its own processors, network interfaces, etc.

As shown in FIG. 4, the memory 406 includes an onboard communications module 408. Onboard communications module 408 is configured to facilitate wireless communications with user devices and with other vehicles via communications interface 438 (e.g., a transceiver, etc.). Communications interface 438 may support any kind of wireless standard (e.g., 802.11 b/g/n, 802.11a, etc.) and may interface with any type of mobile device (e.g., laptop, tablet, smartphone, etc.) having Wi-Fi capability. Communications interface 438 may further facilitate wireless communications with an external global positioning system (GPS). Onboard communications module 408 may be any type of Wi-Fi capable module (e.g., a CL-T04 CANect® Wi-Fi Module manufactured by HED Inc., etc.) configured to support wireless communications with the mobile devices and other response vehicles. In one embodiment, the user devices communicate with the response vehicles via Wi-Fi. In other embodiments, the communications between the user devices and/or response vehicles may be supported via CDMA, GSM, or another cellular connection. In still other embodiments, another wireless protocol is utilized (e.g., Bluetooth, Zigbee, radio, etc.).

Onboard communications module 408 may include various security features for providing secure communications between the central controller 102 and user devices 130. Such a module may further include other response vehicle-related features that may be used in the systems and methods disclosed herein (e.g., diagnostics features, navigation features, etc.). For more detail regarding the onboard communications module, see co-pending U.S. patent application Ser. No. 15/097,278 entitled "Response Vehicle Systems and Methods," hereby incorporated by reference in its entirety.

In the example embodiment shown, the central controller 102 establishes a connection with the user device 130 via the communications interface 438 as controlled by the onboard communications module 408. For example, the user may approach the vehicle 100 with the user device 130. The user device 130 may pick up a wireless signal broadcasted by the communications interface 438. In response, the user may provide an input to the user device 130 to establish a connection to the central controller 102 by inputting credentials (e.g., a password or the like) in the user device 130. In response to receiving such an input, the onboard communications module 408 may cause the processor 404 of the central controller 102 to authenticate the user by comparing the input credentials to credentials stored in the central controller 102 (e.g., in the vehicle database 428). Having authenticated the user, various encryption keys and the like may be exchanged between the user device 130 and the central controller 102 to establish a secure connection between the central controller 102 and the user device 130. Such a connection may support any of the communications between the user device 130 and the central controller 102 described herein. For example, various display datasets in the form of webpages may be transmitted by the central controller 102 to the user device 130 such that the datasets are viewable via a web browser on the user device 130. Such webpages may enable the user to provider various inputs to the central controller 102 described herein.

As shown in FIG. 4, the central controller 102 includes an operator input 430. The operator input 430 is configured to receive inputs from an operator or other personnel and provide various inputs to vehicle subsystems 104-124. The operator input may include one or more buttons, knobs, touchscreens, switches, levers, joysticks, pedals, or handles and associated hardware and software combinations (e.g., analog to digital converters and the like) to convert operator interactions with such components into readable control signals. For example, the operator input 430 may include a button enabling the operator to change the operating mode of the drive system 104 so as to provide mechanical energy to the pumping system 114 via the transmission 108 (i.e., switch the vehicle 100 from "driving mode" into a "pumping mode"). In another example, the operator input 430 may also include an accelerator pedal enabling the operator to provide an input signal to the engine via the drive system interface 436.

As shown in FIG. 4, the central controller 102 includes interfaces 432-434 to the fluid intake system 116 and the fluid output system 124. Interfaces 432-434 communicably couple the central controller 102 to the fluid output system 124 and fluid intake system 116. Interfaces 432-434 may include a jack or other hardware for physically coupling a line or connector to the central controller 102. Alternatively, the interfaces 432-434 may be integrated with the communications interface 438, and such signals may be transmitted and received wirelessly. In any event, interfaces 432-434 receive command signals from the processor 404 and forward control signals to the valves 204 and 302 of the systems 116 and 120 to control characteristics of fluid being received by the vehicle 100 via the pumping system 114 and emitted via the output system 120. In some embodiments, such command signals may be generated by the processor 404 in response to various inputs received from the operator or other personnel. For example, the operator (e.g., via the display 128) may indicate a preference as to the state of the intake valve 204. In response, the processor 404 may generate an intake control signal and transmit the control signal to the intake valve 204 via the interface 436.

Additionally, the central controller 102 receives sensor signals measured by various sensors (e.g., the pressure transducers 202 and 304). For example, a pressure signal from the pressure transducer 202 indicating a pressure level of the fluid source 126 may be received from the fluid intake system 116 via the fluid intake system interface 434. As will be described below, such a signal may be used to generate a control signal transmitted to the drive system 104 via the drive system interface 436. In another example, an input may be received from the fluid output system 124 (e.g., a firefighter may indicate a preference as to the pressure of fluid to be emitted from a particular nozzle 306). As will be described below, such an input may be used by the central controller 102 to control the pumping system 114 so as to generate the desired output.

As shown in FIG. 4, the central controller 102 further includes a drive system interface 436. Drive system interface 436 is shown as an interface for communicably coupling the engine 106, transmission 108, and PTO 112 to the central control system 102. As such, drive system interface 436 may be any hardware and/or software compatible the various connections between central controller 102 and these components. In some embodiments, the vehicle 100 includes various data lines (not shown) connecting the various components herein. Accordingly, the drive system interface 436 and interfaces 432-434 discussed above may include a jack, a solder point, and/or other hardware for physically coupling the controller 102 to the engine 106, transmission 108, and/or PTO 112. Additionally, drive system interface 436 may include communications hardware/software, a digital to analog converter, an analog to digital converter, a circuit for interpreting signals representing RPM, transmission gear level, transmission operating mode, and/or another suitable component. Similar to the interfaces 432-434 discussed above, the drive system interface 436 is configured to provide various control signals to the engine 106, transmission 108, and PTO 112. As described below, such control signals may be based on various inputs received via operator inputs 430 and sensor signals received via interfaces 432-434.

As shown in FIG. 4, the memory 406 includes a transmission control module 410 configured to control the state of operation of the transmission 108. The transmission control module 410 is structured to cause the processor 404 to generate and transmit control signals to the transmission 108 by way of the drive system interface 436. Such control signals may be based on various inputs received by the central controller 102. For example, via the operator input 430 (e.g., via the display 128), the operator may indicate an effective gear ratio preference for the transmission 108. Upon receipt of such an input, the processor 404 may execute the transmission control module 410, which may include a plurality of lookup tables including various instructions for generating a transmission control signal based on the input. Accordingly, the processor 404 may retrieve the appropriate set of instructions based on the received input, generate a control signal based on the retrieved instructions, and transmit the control signal to the transmission 108 by way of the drive system interface 436. Upon receipt of the control signal, a sub-controller of the transmission 108 may activate a solenoid valve so as to engage a clutch corresponding to the desired gear ratio.

In other examples, the transmission control module 410 causes the processor 404 to generate control signals based on various other inputs. One such input may be produced via the location module 426 described below. For example, upon a determination that the vehicle 100 is within a predetermined distance of a fluid source 126 having a positive output pressure (e.g., a fire hydrant or the like), the processor 404 may provide a location input to the transmission control module 410. Such an input may cause the processor 404 to execute certain program logic of the transmission control module 410. This program logic may cause the processor 404 to identify the operational state of various vehicle subsystems such as the PTO 112 (e.g., whether the vehicle has been placed into a pumping mode by the engaging of a clutch to provide mechanical energy to the pumping system 114), the engine 106 (e.g., the RPM level) and the transmission 108 (e.g., the current operation gear ratio). In some embodiments, upon determining that the vehicle has been placed into pumping mode (e.g., via an input provided from the operator inputs 430), the engine 106 is operating at an RPM below a certain threshold, and that the transmission 108 is operating in a default pumping gear ratio (e.g., 1:1), the program logic may further cause the processor 404 to produce a control signal and transmit the control signal to the transmission 108 by way of the drive system interface 436. For example, the processor 404 may access a fluid source pressure lookup table and retrieve a set of instructions based on the output pressure of the fluid source 126 (as identified by the information included in the location module 426) to generate a transmission control signal. The transmission control signal may cause the transmission 108 to down-shift the transmission to a higher gear ratio so as to increase the rate of operation of the engine 106 while maintaining the amount of mechanical energy provided to the pumping system 114 via the PTO 112.

Another input to the transmission control module 410 may be produced by the processor 404 in response to a sensor signal received from the fluid intake system 116. For example, the pressure transducer 202 may produce a signal indicative of the pressure from the fluid source 126 at the intake valve 204. If the indicated pressure is above a predetermined threshold, a pressure-based input may be provided to the transmission control module 410. Such an input may cause the processor 404 to execute certain program logic of the transmission control module 410 so as to cause the processor 404 to perform similar to those discussed above with respect to the location input.

As shown in FIG. 4, the memory 406 further includes a PTO control module 412 configured to control the operation of the PTO 112 so as to place the vehicle 100 into a pumping mode and/or a driving mode. In some embodiments, the PTO control module 412 is configured to switch the control system 102 from a driving mode to a pumping mode in response to various inputs. For example, the operator may select a pumping mode via the operator inputs 430, or an external user may provide such a command via a secure connection with a user device 130 and, in response, the PTO control module 412 may cause the processor 404 to transmit a control signal to the PTO 112 to cause energy from the transmission 108 to be directed to the pumping system 114. For example, the control signal may activate a solenoid valve of the PTO 112 so as to engage a clutch to couple the PTO 112 with an output shaft of the transmission 108. A similar input may be received via the location module 426. For example, if the processor 404 determines that the vehicle 100 is stationary and that the location of the vehicle 100 is within a predetermined distance of a destination, the vehicle 100 may be automatically placed into the pumping mode.

As shown in FIG. 4, the memory 406 further includes an engine control module 414 configured to control the operation of the engine 106. Similar to the transmission control module 410, the engine control module 414 may cause the processor 404 to access a plurality of lookup tables in response to various inputs. For example, the operator may press an accelerator pedal of the operator input 430 so as to provide a throttle input to the central controller 102. In response, the processor 404 may execute the engine control module 414, access a lookup table to convert the input to a throttle signal, and transmit a corresponding control signal to the engine 106 so as to cause the engine 106 to operate at the preferred rate.

The engine control module 414 is also configured to control the engine 106 when the vehicle 100 is placed into pumping mode. When in pumping mode, the engine control module 414 may cause the processor 404 to control the operational rate of the engine 106 so as to provide sufficient mechanical energy to the pumping system 114 to provide a desired fluid output at the fluid output system 124. In some embodiments, the operator (e.g., via the display 128) or other user (e.g., a user of the fluid output system 124 at the point of fluid output) may provide inputs as to a preferred output pressure for fluid at the fluid output system 124, causing the processor 404 to control the operational rate of the engine 106 to maintain the desired output pressure. The engine control module 414 may also cause the processor 404 to control the operational rate of the engine in response to various sensor signals measured by the fluid intake system 116 and fluid output system 124. For example, in response to a decrease in the output measured by the transducers 304 of the fluid output system 124, the processor 404 may cause the operational rate of the engine 106 to increase so as to maintain the output pressure at a previous level. Similar input signals may also be provided a sensor of the pumping system 114 (e.g., a transducer measuring the pressure of the output provided to the fluid output system 124).

The control signals produced for the engine 106 via the engine control module 414 may vary depending on the state of various other vehicle subsystems. For instance, if the vehicle 100 has been placed into a pumping mode, the control signals produced may be different than if the vehicle 100 is placed into driving mode. As such, the dependence of the engine control signals on the current state of the transmission 108 (e.g., the current gear ratio) may vary depending on whether the vehicle 100 is placed into pumping mode or driving mode.

As shown in FIG. 4, the memory 406 further includes a pump system control module 416. In various example embodiments, the pump system control module 416 may cause the processor 404 to control various components of the pumping system 114. For example, in some embodiments, the pumping system 114 includes a secondary power source (e.g., other than the engine 106) such as an electrical motor. The pump system control module 416 may cause the processor 404 to control the operation of the secondary power source in response to the operational rate of the engine 106, the output pressure of the pumping system 120, the intake pressure at the fluid intake system 116, and so on.

Additionally, the pump system control module 416 may also change various characteristics of the fluid outputs of the pumping system 114 (e.g., the output provided to the fluid output system 124) depending on the selected mode of operation for the pumping system 114. In the example embodiment disclosed herein, the pumping system 114 may be placed into various modes of operation based on various inputs. For example, the operator (via the operator input 430) or other user (e.g., via a secure connection with a user device 130) may provide an input to place the pumping system into various modes depending on the type of fire that the vehicle 100 is being used to combat. In one embodiment, the pumping system 114 may be placed into three different modes: a vehicle fire mode, a vegetation fire mode, and a relay pumping mode. In the vehicle fire mode, the foam system 122 is activated such that foamant from the foam tank 120 is introduced into the outlet flow of the pumping system 114, and the pumping system 114 is controlled so as to provide an output to the fluid output system 124 at a first output pressure. Accordingly, the pump system control module 416 may control various valves in the pumping system 114 based on the operational level of the engine 106 so as to produce an output at the first output pressure. In the vegetation fire mode, the foam system 122 is not activated and the pumping system 114 is controlled so as to provide an output at a second output pressure to the fluid output system 124. The second output pressure may vary from the first output pressure.

In the relay pumping mode, the vehicle 100 serves to deliver fluid to another vehicle. In other words, the output of the pumping system 114 serves as a fluid source 126 for the other vehicle. Given this, rather than providing a fluid output to the various nozzles 308 of the output system 124 shown in FIG. 3, the pumping system 114 may deliver fluid to a single outline line. Additionally, the pump system control module 416 may configure the pumping system 114 to produce an output initially at a third output pressure that is lower than the first output pressure and the second output pressure discussed above to prevent problems at the intake system (e.g., similar to the intake system 116) of the other vehicle. The output pressure produced by the pumping system 114 may increase a predetermined rate until the inlet pressure at the other vehicle (e.g., as measured by a pressure transducer in a fluid intake system similar to the fluid intake system 116) reaches a target level.

Additionally, when in relay pumping mode, the pump system control module 416 may control the operation of the vehicle 100 based on various inputs received from the other vehicle to which the vehicle 100 is connected. For example, the other vehicle may transmit such inputs to the central controller 102 via a secure connection established in a way similar to the secure connection with the user device 130 discussed above. The inputs may include, for example, the output pressure at the output system (e.g., similar to the output system 124) of the other vehicle, the RPM of the engine of the other vehicle, the intake pressure at a fluid intake system (e.g., similar to the fluid intake system 116), and the like. In any event, if the central controller 102 receives an indication that the other vehicle has a diminished demand for fluid from the vehicle 100 (e.g., as indicated by a decrease in the RPM rate, or an output pressure of the other vehicle), the pump system control module 416 may cause the processor 404 to produce a control signal to reduce the output pressure produced by the pumping system 114 (e.g., by decreasing the RPM of the engine 106, by adjusting the intake valve 204 of the fluid intake system 116, adjusting an output valve of the pumping system 114, etc.). As such, undue pressure on the intake system of the other vehicle is beneficially avoided.

As shown in FIG. 4, the memory 406 further includes a foam system control module 418 configured to control the operation of the foam system 122. As such, the foam system control module 418 may be structured to cause the cause the processor 404 to produce various control signals to actuate various elements of the foam system 122 (e.g., electric check valve, a power source for the foam system 122, etc.) based on various inputs. For example, upon the vehicle 100 being placed in the vehicle fire mode discussed above, a control signal may open the check valve of the foam system 122 and cause a pump associated with the foam system 122 to draw foamant from the foam tank 120 at a predetermined rate. Additionally, the operator or other user may input preferences as to a preferred level of foam output to control the pump of the foam system 122.

As shown in FIG. 4, the memory 406 further includes a display module 422. The display module 422 is structured to cause the processor 404 to generate various displays for viewing by the display 128. In the example embodiments shown, the displays presented via the display 128 may vary depending on various inputs received from the operator or other user. For example, the display module 422 may include a menu navigation module (not shown). The menu navigation module may present the operator with a menu interface presenting various options to the operator. Each option may include a selectable widget configured to cause the display module 422 to generate and/or retrieve a particular display in response to the operator's selection of the widget (e.g., by the operator touching the screen of the display 128 in a position that corresponds to a particular widget).

For example, the menu interface may include vehicle operation widget. In response to the operator selecting the operation widget, the display module 422 may cause the processor 404 to present the operator with the status of various subsystems of the vehicle 100. Such a display may include, for example, identify current operational status of the vehicle 100 (e.g., whether the vehicle has been placed into a pumping mode or a driving mode), a mode of operation of the pumping system 114 (e.g., the pumping system 114 may be placed in either an RPM mode, where the user controls the pump based a RPM level of the engine 106, or a pressure mode, where the operator can select an output pressure for the pumping system 114 at either the fluid output system 124 or the intake of the fluid output system 124), a vehicle driveline states (e.g., a current RPM of the engine 106), and various descriptors of the operation of the pumping system 114 (e.g., current discharge pressure at various nozzles 308 of the fluid output system 124, intake pressures measured by the fluid intake system 116, intake vacuum(s), water temperatures, water levels in the water tank 118, foam levels, etc.). While display module 422 is described with reference to the vehicle 100 in FIG. 4, it should be understood that display module 422 may provide the same or a similar type of interface, with the same, similar, or different types of features (e.g., touchscreen input capability, etc.) to the user devices 130 as well.

As shown in FIG. 4, the memory 406 includes a diagnostics module 424. The diagnostics module 424 is structured to enable the processor 404 to process data received via the interfaces 432-436 discussed above. For example, via the diagnostics module 424, the processor 404 may compare the data received from various sensors on the vehicle 100 to various baseline values, and generate a diagnostics report. For example, upon the central controller 102 receiving a signal indicating a current RPM level of the engine 106 and a current gear ratio of the transmission, the diagnostics module 410 may interface with the display module 422 to produce graphical representations of such signals for presentation to the operator via the display 128.

In the example embodiment shown, diagnostics module 424 is also specifically configured to monitor the operation of the pumping system 114. In this regard, the diagnostics module 424 may include a data logger configured to store various data points measured by various sensors capturing data regarding the operation of the pumping system 114. For example, the diagnostics module may monitor the pressure of the output of the pumping system 114 as a function of the RPM of the engine 106. The diagnostics module 424 may also compare the relationship between these values (e.g., the rate of change in the RPM versus the rate of change of the output pressure of the pumping system 114) with a baseline relationship (e.g., gathered at a routine performance check) so as to determine if the performance of the pumping system 114 is in decline. If so, the diagnostics module 424 may interface with the display module 422 to generate a pumping system alert. Similarly, an alert may be presented to the operator if the water tank 118 has a level of water below a predetermined threshold or if the intake pressure (e.g., as measured by the fluid intake system 116) is above a predetermined threshold. Additionally, similar to the subsystem displays discussed above, the diagnostics module 424 may further interface with the display module to provide graphical representations of various other aspects of the operation of the pumping system (e.g., discharge pressures, intake pressures, intake vacuum, water temperatures, etc.).

As shown in FIG. 4, the memory 406 includes a location module 426. The location module 426 is configured to provide navigational assistance to the vehicle 100. In this regard, the location module 426 may include datasets containing information pertaining to routes to various destinations. A destination may be provided to the vehicle 100 (e.g., via a user device 130), and the processor 404 may identify a route to the destination using the information included in the location module 426. Step-by-step navigation instructions may be presented to the operator of the vehicle 100 to assist the vehicle 100 timely arriving at the indicated destination.

Alternatively or additionally, the location module 426 may store various datasets pertaining to various locations of interest to personnel (e.g., commanders, firefighters, and the like) associated with the vehicle 100. For example, the location module 426 may store information pertaining to the location of various fluid sources 126. The information may include location coordinates for various fluid sources 126, and identify the output pressure of the identified fluid sources 126. Further, program logic included in the location module 426 may cause the processor 404 to compare the current location of the vehicle 100 (e.g., as measured by a GPS system within the vehicle 100) with the location coordinates of the fluid sources 126 to determine if the vehicle 100 is within a predetermined distance (e.g., the length of an inlet line of the fluid intake system 116) of one of the fluid sources 126. Upon such a determination, an input may be provided to the transmission control module 410, as described herein.

As shown in FIG. 4, memory 406 also includes a vehicle database 428 configured to store various forms of information pertaining to the vehicle 100. The vehicle database 428 may include, for example, telemetric data captured by the various sensors discussed above. For example, as discussed above the diagnostics module 424 may include a data logger or the like that stores any sensor signals received from the drive system 104, PTO 112, pumping system 114, fluid intake system 116, water tank 118, foam system 122, and fluid output system 124. As such, the vehicle database 428 may include a plurality of telemetry datasets, with each dataset corresponding to a different sensor. Each dataset may include a plurality of entries, with each entry including a sensor signal value and a time stamp. Alternatively or additionally, the vehicle database 428 may store the vehicle subsystem reports generated via the diagnostics module 424.

In some embodiments, the vehicle database 428 also includes electronic versions of various manuals associated with the fire truck 100. For example, the vehicle database 428 may include digital versions of an operator manual of the fire truck 100. The operator manual may include descriptions of various components of the fire truck 100. The operator manual may be stored in a format such that it is presentable to the operator via the display 128. The central controller 102 may further include a searching algorithm enabling in the operator to selectively retrieve various portions of the operator manual (e.g., pertaining to specific vehicle subsystems 104-124). Alternatively or additionally, the operator manual may be stored such that it is transmittable via the communications interface 438 to various external computing systems (e.g., the user device 130). This way, other users of the vehicle 100 may interface with the operator manual. The vehicle database 428 may also include various other manuals, such as an operating procedure for pumping, hazardous materials manuals, and the water supply maps discussed above with respect to the location module 426.

Additionally, the vehicle database 428 may also store various forms of information pertaining specifically to the pumping system 114. For example, the vehicle database 428 may include information pertaining to the pressure loss and the friction loss associated with various outlets of the fluid output system 124. Alternatively or additionally, vehicle database 428 may also store pressure and friction loss charts for the outlets for viewing via the display 128. This way, various personnel may calculate the pressure and friction charts for the respective outlets of the fluid output system 124.

The data may be removed from the vehicle database 428 once the data is uploaded to a remote cloud storage. For example, long-term storage of the telemetry data and other data may be done on a centralized server, and communications interface 438 may wirelessly connect with a remote server to transmit and store the data. The data includes a timestamp and vehicle identifier information to identify the data in remote server.

In one embodiment, the data is automatically updated periodically. The data may also be updated upon user request. A controller area network (CAN) controller, such as diagnostics module 424 or another module may be configured to monitor the data and to determine when a potential status of the fire truck has changed based on the telemetry data changes.

Vehicle database 428 may be any type of database (e.g., a SQLite database, etc.), and modules 408-424 may query the database using any type of language or method via backend framework. The backend framework of the central controller 102 may support the activities of periodically updating and querying vehicle database 428, as well as providing web layer authentication (e.g., to authenticate devices that attempt to access data from vehicle database 428, etc.). The backend framework may further support the various security-related functionality of onboard communications module 408.

Central controller 102 may include, for example, a data transport protocol layer configured to facilitate the query of data from vehicle database 428 for use by the various modules of memory 406. In one embodiment, at least one of web sockets and AJAX polling is used to invoke queries via backend framework and provide the data to the frontend applications (e.g., the application layer, the modules, etc.), as they allow changes to database 428 to be detected and pushed to the application layer. The use of web sockets and/or AJAX may be based on compatibility constraints and performance constraints with the user devices 130 accessing central controller 102. The application layer, or the frontend application, of central controller 102 may be built using, for example, HTML5, CSS, and various Javascript libraries.

Figure 5:
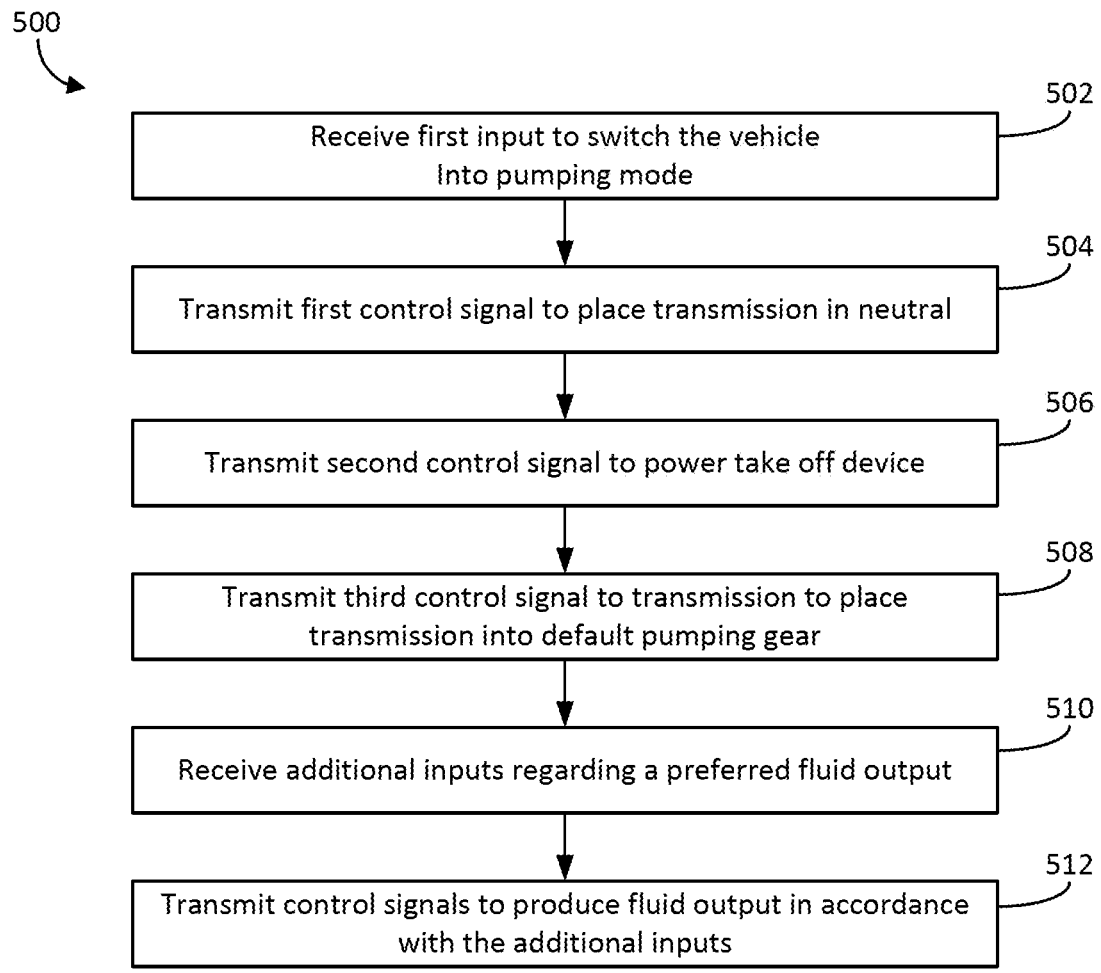
FIG. 5 is a flow chart of a process for providing a fluid output to an area of interest, according to an exemplary embodiment.

Referring now to FIG. 5, a flow chart of a process 500 for providing a fluid output to an area of interest is shown, according to an exemplary embodiment. Process 500 may be executed by, for example, the transmission control module 410, power take off control module 412, engine control module 414, and/or pump system control module 416 of the central controller 102 discussed above. Process 500 may be executed to provide a desired fluid output to a zone of interest.

Process 500 includes receiving a first input to switch the vehicle 100 into pumping mode (block 502). For example, the operator may provide various inputs to the central controller 102 to bring the vehicle 100 to the scene of an incident (e.g., a fire). In some embodiments, the operator may stop the vehicle 100 and, via the operator inputs 430, pull a lever so as to indicate a preference to put the vehicle 100 into pumping mode. In some embodiments, such an input may be provided at the fluid output system 124. For example, a user may pull on an outlet of the fluid output system 124 so as to disengage the output from a holding device to provide an input to place the vehicle 100 into a pumping mode.

Alternatively, the processor 404 may execute the location module 426 and determine that the vehicle 100 is within a predetermined distance of a destination provided by a dispatcher. Upon determining that the vehicle 100 is within the predetermined distance and that the vehicle 100 has stopped moving (or that the parking brake of the vehicle 100 is engaged), the central controller 102 may proceed in the process 500.

Process 500 includes transmitting control signals to the transmission 108 and the PTO 112 to place the vehicle into pumping mode (blocks 504 and 506). Upon receipt of the input to place the vehicle 100 into pumping mode at block 502, the processor 404 may execute the transmission control module 410 to produce a first control signal disengage various clutches of the transmission 108 so as to place the transmission 108 into neutral. For example, the transmission 108 and PTO 112 may be arranged such that the transmission 108 must be disengaged from the drive shaft 110 (and thus in neutral) in order to provide any mechanical energy to the pumping system 114. In some embodiments, the central controller 102 may perform various other checks on certain vehicle subsystems prior to placing the transmission 108 into neutral. For example, the central controller may verify that the parking brake of the vehicle 100 is engaged.

Having placed the transmission 108 into neutral, the processor 404 may generate second control signal and transmit that control signal to the PTO 112. The control signal may engage a clutch of the PTO 112 so as to mechanically couple an output shaft of the transmission 108 to a shaft of the PTO 112 coupled to the pumping system 114. Thus, at this point, the vehicle 100 has been placed into pumping mode because the pumping system 114 may receive mechanical energy produced by the engine 106.

Process 500 includes transmitting a third control signal to the transmission 108 to place the transmission 108 into a default pumping gear (block 508). For example, the department with which the vehicle 100 is associated or the manufacturer of a vehicle 100 may set a default gear ratio for the transmission 108 to drive the pumping system 114. In one embodiment, the default gear ratio is 1:1 (e.g., $4^{th}$ gear). Accordingly, a third signal to place the transmission 108 into the default gear ratio may be generated by the processor and transmitted to the transmission 108 by way of the drive system interface 436. Upon this occurring, a throttle control signal may be transmitted to the engine 106 so as to cause the pumping system 114 to create a pressure differential in the intake system 116 to begin drawing fluid from the fluid source 126.

Process 500 includes receiving additional inputs regarding a preferred fluid output (block 510) and providing control signals to various subsystems to produce the preferred output (block 512). Such inputs may be used by the central controller 102 to control the operation of the pumping system 114 by controlling the operational rate of the engine 106. Certain inputs may be received automatically from various sensors within the vehicle. For example, a pressure transducer in the pumping system 114 may measure the overall output pressure produced by the pumping system 114 to the fluid output system 124, and the central controller 102 may provide control signals to the engine 106 to maintain this overall output pressure. In another example, the pressure transducer 202 of the fluid intake system 116 may provide such an input. For example, if the pressure transducer 202 provides a signal indicative of a positive pressure from the fluid source 126, the controller 102 may transmit control signals to the engine 106 to reduce the operational rate of the engine (e.g., because less energy is needed from the pumping system 114 to provide the same amount of fluid). In another example, such inputs may be provided by the pressure transducers 304 of the fluid output system 124. In response to a sudden decline in the output pressure (e.g., a decline in output pressure at an outlet line by more than a predetermined amount in less than a predetermined period), for example, the central controller 102 may increase the RPM of the engine 106 to bring the output pressure back to a previous value (e.g., back to a steady state value prior to the sudden decline).

Other inputs regarding a preferred fluid output may be received from the operator of the vehicle 100 or other users. For example, emergency personnel operating the nozzles 308 of the fluid output system 124 may provide various inputs via user inputs 306. The inputs provided may indicate preferred output pressures at the various nozzles 308. In embodiments where the output system 120 includes a plurality of fluidic outputs, the processor 404 may determine a total required water flow to the fluid output system 124 to produce the preferred output pressures (e.g., based on the lengths of the various outlet lines, the nature of the nozzles 308, etc.), and access a lookup table to generate an engine control signal to cause the pumping system 114 to provide a sufficient volume of water to the fluid output system 124. Additionally, the central controller 102 may provide control signals to the output valves 302 associated with the various outputs so as to provide an amount of fluid to each output that corresponds with the desired output pressure at that output.

Alternatively or additionally, a pump operator may provide various inputs as to preferred output pressure at the various outlet lines of the fluid output system 124. Additionally, the operator may indicate such preferences via the display 128, or another user may provide such inputs with a user device 130 via a secure connection with the central controller. Thus, the systems and methods disclosed herein allow for flexible control of the pumping system 114 from various vantage points.

Figure 6:
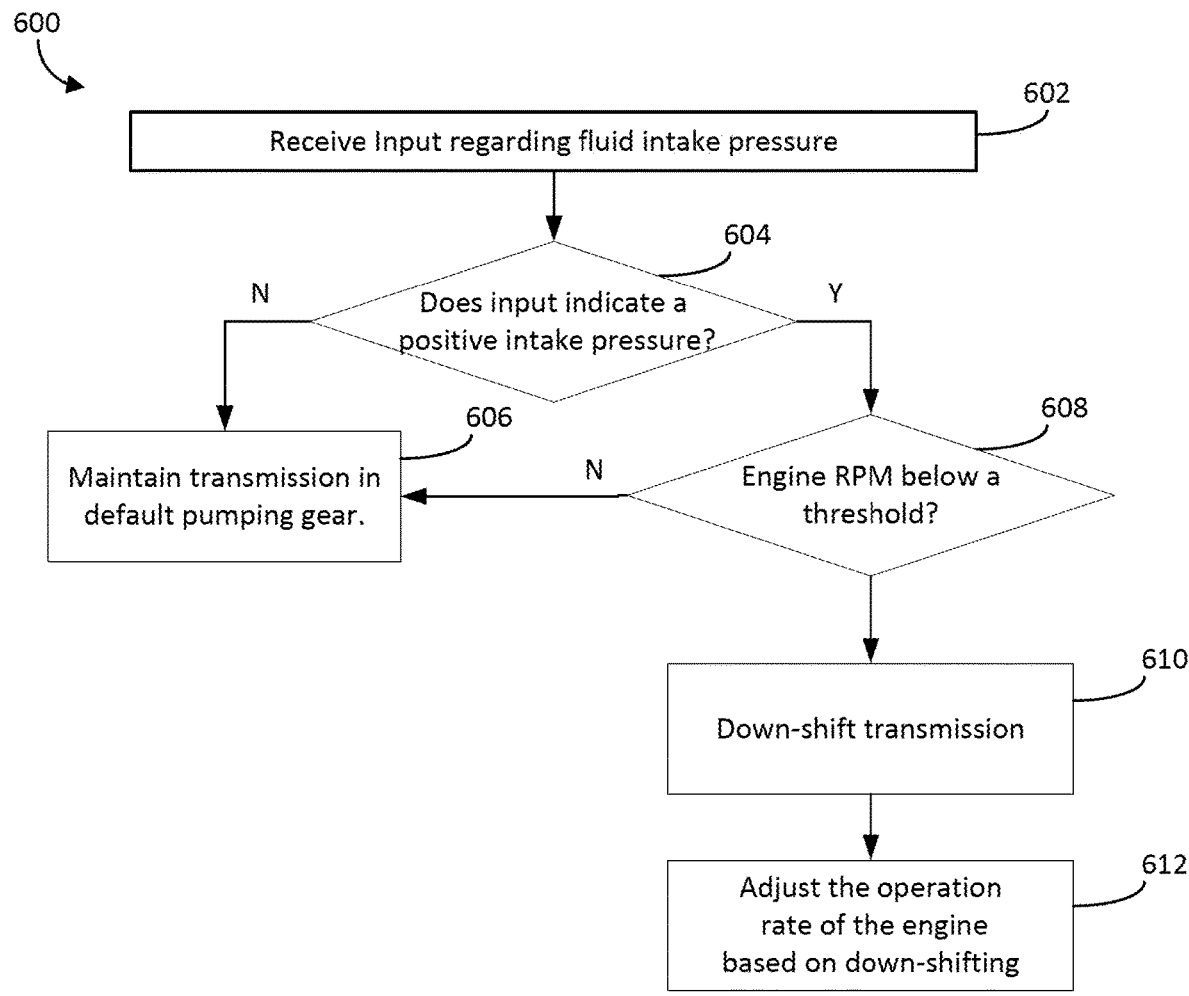
FIG. 6 is a flow chart of a process for controlling a transmission of a response vehicle based on an intake pressure of a pumping system, according to an exemplary embodiment.

Referring now to FIG. 6, a flow chart of a process 600 for providing pressure control is shown, according to an exemplary embodiment. Process 600 may be executed by, for example, the transmission control module 410, engine control module 414, and/or pump system control module 416 of the central controller 102 discussed above. Process 600 may be executed to improve vehicle operation while in pumping mode.

It should be understood that initiation of the process 600 may take a number of forms. For example, in some embodiments, the process is 600 is initiated automatically once the vehicle 100 is placed into a pumping mode (e.g., by performing blocks 502-508 of the process 500 discussed above). In some embodiments, the process 600 begins upon receipt of the input at step 602 described below.

Process 600 incudes receiving an input regarding a fluid intake pressure (block 602) and determining if the input indicates that the intake pressure is positive (block 604). As discussed above, such an input may be received from an operator or other user, generated by the processor 404 via the location module 426 (e.g., in response to determining that the location of the vehicle is 100 within a predetermined distance of a pre-identified fluid source 126), or received from the fluid intake system 116 (e.g., via pressure transducer 202). Whether the input indicates a positive intake pressure may be determined based on the nature of the input. For example, the operator may indicate the output pressure of a fluid source 126, or the output pressure of a fluid source 126 may be pre-identified by information stored in the vehicle database 428.

If the input does not indicate a positive intake pressure, the transmission 108 is maintained at the default pumping gear discussed above (block 606). In such a case, the central controller 102 may continue to perform processes similar to those discussed above at steps 510 and 512 of the process 500 discussed above. If, however, the input does indicate a positive intake pressure, the central controller 102 determines if the engine RPM is below a predetermined threshold (block 608). If the fluid source 126 provides a positive intake pressure, less energy is required from the pumping system 114 to produce a desired output. Furthermore, less energy to the pumping system 114 may be required to avoid over-pressurizing the various components of the pumping system 114 and/or fluid intake system 116. Accordingly, in traditional response vehicles, the operator may reduce the engine RPM of the engine 106. This practice may lead to degradations in performance of various other subsystems of the vehicle 100. For example, bringing the engine RPM down may throw the alternator of the vehicle 100 off of an optimal performance curve, leading to deficient powering of various other components (e.g., the air conditioning). Thus, in some embodiments, the predetermined threshold may be determined based on the performance curve of the alternator of the vehicle 100.

To prevent the above-described deficiencies in the event of a positively pressured fluid source 126, process 600 includes down-shifting the transmission 108 to a higher gear ratio in response to a positive intake pressure (block 610). For example, if the default pumping gear of the vehicle 100 is $4^{th}$ gear, the central controller 102 may transmit a control signal to cause the transmission 108 to automatically shift into $3^{rd}$ gear. Thus, the engine 106 is able to operate at a higher RPM without over-pressurizing the pumping system 114. This enables, for example, the alternator of the vehicle 100 to operate more favorably and therefore for better operation of various other vehicle subsystems.

Process 600 includes adjusting the operation rate of the engine 106 based on the downshifting (block 612). For example, the necessary amount of throttling for the engine 106 to produce a given output pressure for the pumping system 114 is now higher given the down-shifting of the transmission 108. As such, to maintain the various output pressures of the pumping system 114 described herein (e.g., at preferred levels indicated by the users at the various nozzles 308), the central controller 102 may access various down-shifted pumping lookup table (e.g., included in the engine control module 414) to generate a control signal for the engine 106 to continue to produce the amount of mechanical energy required to maintain the desired water output.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). By way of example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, by way of example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A vehicle comprising:
   an engine;
   a transmission coupled to the engine;
   a pumping system selectively coupled to the engine by the transmission, the pumping system configured to receive an inlet flow of water from a water source; and
   a controller configured to:
      receive an indication regarding a pressure of the inlet flow of water; and
      transmit a control signal to the transmission to change a gear of the transmission based on the indication regarding the pressure of the inlet flow of water.

2. The vehicle of claim 1, wherein the controller is configured transmit the control signal to the transmission in response the pressure of the inlet flow of water being greater than a threshold pressure.

3. The vehicle of claim 2, wherein the control signal causes the transmission to downshift from a first, higher gear to a second, lower gear.

4. The vehicle of claim 1, wherein the controller is configured to:
   operate the transmission in a first gear in response to the pressure of the inlet flow of water not being positive; and
   operate the transmission in a second gear in response to the pressure of the inlet flow of water being positive.

5. The vehicle of claim 4, wherein the first gear is a higher gear than the second gear.

6. The vehicle of claim 1, further comprising a sensor configured to measure the pressure of the inlet flow of water.

7. The vehicle of claim 1, further comprising a user interface configured to receive the indication regarding the pressure of the inlet flow of water.

8. The vehicle of claim 1, wherein the controller is configured to:
   determine a location of the vehicle based on the indication; and
   determine the pressure of the inlet flow of water based on the location.

9. The vehicle of claim 8, wherein the controller is configured to store a plurality of locations, each of the plurality of locations having a water source configured to provide the inlet flow of water at a predefined pressure.

10. The vehicle of claim 1, wherein the controller is configured to automatically enter the pumping system into a pumping mode in response to at least one of (i) the vehicle being within a threshold distance of a destination, (ii) the vehicle being stationary, or (iii) a parking brake of the vehicle being engaged.

11. The vehicle of claim 10, wherein the controller is configured to automatically enter the pumping system into the pumping mode at least in response to (i) the vehicle being within the threshold distance of the destination and (ii) the vehicle being stationary.

12. A vehicle comprising:
a pumping system configured to receive an inlet flow of water from a water source; and
a controller configured to:
determine a location of the vehicle; and
automatically enter the pumping system into a pumping mode at least in response to the vehicle being within a threshold distance of a destination.

13. The vehicle of claim 12, wherein the controller is configured to automatically enter the pumping system into the pumping mode at least in response to (i) the vehicle being within the threshold distance of the destination and (ii) the vehicle being stationary.

14. The vehicle of claim 12, further comprising:
an engine; and
a transmission coupled to the engine;
wherein the pumping system is selectively coupled to the engine by the transmission.

15. The vehicle of claim 14, wherein the controller is configured to:
receive an indication regarding a pressure of the inlet flow of water; and
transmit a control signal to the transmission to change a gear of the transmission based on the indication regarding the pressure of the inlet flow of water.

16. The vehicle of claim 15, wherein the controller is configured transmit the control signal to the transmission in response the pressure of the inlet flow of water being greater than a threshold pressure.

17. The vehicle of claim 16, wherein the control signal causes the transmission to downshift from a first, higher gear to a second, lower gear.

* * * * *